Sept. 24, 1963
J. HAYES
3,104,476
ROW CROP CULTIVATOR GAUGE
Filed Nov. 14, 1958
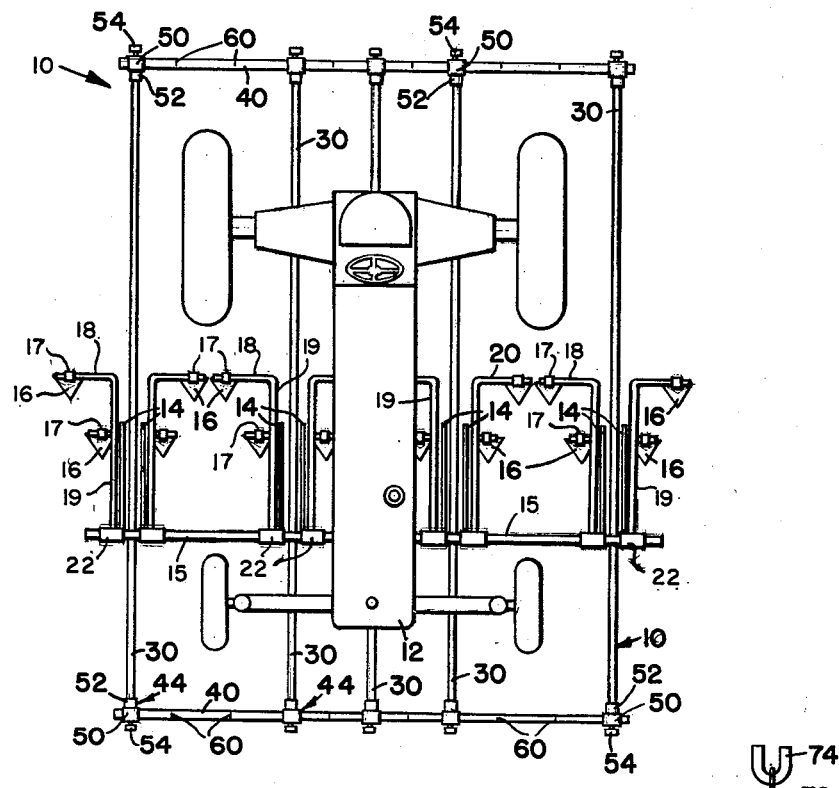
FIG. 1
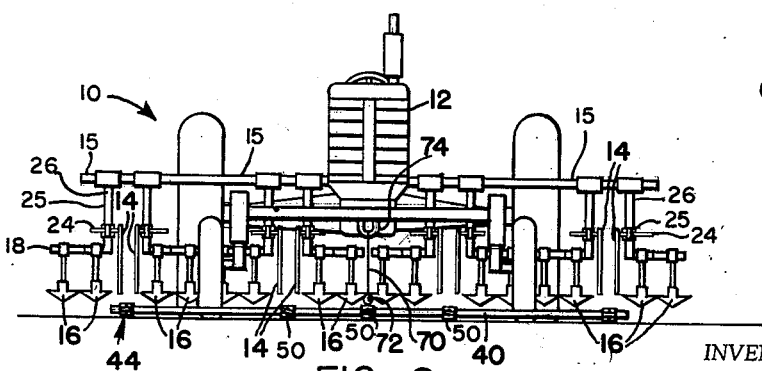
FIG. 2
FIG. 3
INVENTOR.
JERRY HAYES
BY United States Patent Office 3,104,476
Patented Sept. 24, 1963

3,104,476
ROW CROP CULTIVATOR GAUGE
Jerry Hayes, Clarks, Nebr.
(2223 E. 34th, Spokane, Wash.)
Filed Nov. 14, 1958, Ser. No. 773,944
3 Claims. (Cl. 33—185)

This invention relates to gauges and more particularly it is an object of this invention to provide a gauge for the specific use of facilitating the alignment of cultivator shields and shovels on a tractor.

Heretofore, it has been the custom for a farmer to drive a tractor to the edge of a field containing a row crop, attempting to place the front of the tractor in a position centered between two rows. Thereafter, the farmer edges the portions of the various cultivator shields and shovels between the various other rows. This has many difficulties. It is difficult for the farmer to center the front end of the tractor accurately. Also, the rear end of the tractor is even more frequently out of alignment with the rows.

It is therefore an object of this invention to provide a row crop cultivator gauge comprising a plurality of straight elongated parallel row guides adapted to be laid on the ground under a tractor in such positions that they are effective in assisting the positioning of cultivator shields and shovels relative thereto, thereby providing an inexpensive, simple means for eliminating much costly difficulty and providing the farmer with considerable relief.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawings:

FIGURE 1 is a top plan view of a tractor with the row crop cultivator gauge of this invention disposed there beneath.

FIGURE 2 is a frontal elevation of the part shown in FIGURE 1.

FIGURE 3 is a detail showing a centering device of the invention.

In the accompanying drawings, and in the following specification, the same reference characters are used to designate the same parts and elements throughout, and in which the numeral 10 refers to the invention in its entirety, numeral 12 indicating a tractor on which the gauge is mounted, numeral 14 indicating shields for preventing plants being covered with soil, numeral 15 indicating a shaft by which the framework and gauge thereof are mounted on a tractor, numeral 16 indicating shovels positioned to dig into soil at the sides of rows of plants, numeral 17 indicating hubs extended from the shovels and by which the shovels are carried on transverse end bars 18 of longitudinally disposed side bars 19 of L-shaped members 20 of the framework, numeral 22 indicating sleeves on the transverse shaft 15 of the framework and from which the side bars 19 extend, numeral 24 indicating pins by which the shields are adjustably mounted by collars 25 on upwardly disposed sections 26 of the side bars 19, and numeral 30 indicating the row guides or rods which are mounted by clamps 50 on the supporting bars 40.

The guide framework is suspended from a tractor by the shaft 15 which extends through and is secured in the tractor housing. The framework is positioned so that the row guides and supporting bars are spaced slightly above the surface of the ground.

The invention comprises a plurality of pairs of straight elongated parallel rods or row guides 30 which are disposed to extend forwardly and rearwardly of a vehicle carrying shovels to be aligned with a center rod between pairs of the row guides 30 of the tractor extending forwardly and rearwardly. Two elongated supporting bars 40 are spaced from the forward and rearward ends of the vehicle and are connected to ends of the row guides 30, respectively. The supporting bars are disposed normal to the row guides and the center row guide provides a reference point for facilitating the positioning of the other row guides.

Suitable connecting means is provided and is generally indicated at 44 for connecting each respective end of each row guide 30 to its supporting bar 40 and these will later be described in detail. The row guides 30 are disposed and coincide with rows of a row crop whereby the guides 30 can be placed under a tractor or other vehicle 12 and the positioning of the shovels 16 of the tractor laterally can be guided by the row guides 30.

Each attachment means 44 comprises a clamping means or collar 50 disposed about the respective supporting bar 40 on a straight portion of the supporting bar 40 and it is preferable that the entire length of the supporting bar 40 be straight. Each clamping means 44 in addition to its collar 50 further comprises an inwardly extending cylindrical tubular portion 52 which is attached at one end to the inner side of the respective collar 50, each collar 52 being of sufficient diameter to receive the respective end of the respective elongated row guide 30.

Each collar 50 has a threaded set screw 54 threadedly extended through its outer side and adapted to press against the respective supporting bar for clamping the respective collar 50 to the supporting bar 40.

It is desirable that the supporting bars 40 each have longitudinally spaced gauge indicia or graduations 60 at certain places thereon to speed the farmer's positioning of the row guides 30.

One of the row guides 30 is disposed in use under the center of the tractor extending forwardly and rearwardly and in operation the farmer positions the entire cultivator gauge of this invention by the proper positioning of the center row guide 30 as is facilitated by a centering device shown in FIGURE 3. The centering device has an elongated flexible member 70 having a weight preferably in the form of a ball 72 on its lower end and suspended from the under side of the tractor 12 by means of a magnet 74, which latter is adapted to cling to the underside of the tractor as best seen in FIGURE 2. The upper end of the flexible member 70 is attached to the magnet 74 such as by extending around it and being secured to itself by a wrapping as at 76.

In operation it will be seen that all the farmer need do is attach the centering device up under the transverse center of the tractor and lay the various parts of the cultivator gauge on the ground with the center row guide 30 under the weight 72, as shown in FIGURE 1, and then adjust the lateral positions of the row guides 30 with the assistance of the indicia 60, and then position his cultivator shields and shovels quickly with respect to the row guides 30 either by eyesight or by measuring device.

I claim:

1. In a row crop cultivator gauge, the combination which comprises spaced pairs of longitudinally disposed parallel rods providing row guides, a single longitudinally disposed center rod positioned between pairs of rods and parallel to said rods, the center rod providing means for facilitating the alignment of the row guides with respect to a vehicle, supporting bars at forward and rearward ends of the row guides and normal to said guides, collars connecting said row guides to the supporting bars whereby the row guides can be placed in positions spaced correspondingly to the spacing of rows of plants, and a weight suspended by a flexible member from a magnet designed to be retained by magnetism therein to the transverse center of the underside of a vehicle for facilitating the centering of said center rod with respect to said vehicle.

2. In a row crop cultivator gauge, the combination which comprises laterally spaced pairs of longitudinally disposed parallel rods providing row guides, each pair of said rods being positioned to straddle wheels at the sides of a tractor, a single longitudinally disposed center rod positioned between pairs of said row guides and parallel to said row guides, said center rod providing aligning means for positioning the row guides on a tractor with the row guides in registering relation with rows of plants, transversely disposed supporting bars positioned forwardly and rearwardly of said tractor, normal to the row guides, and positioned to connect ends of said row guides, collars having longitudinal and transverse bores extended therethrough positioned to receive the row guides and supporting bars, respectively, clamping means in said collars, a plumb bob, and a magnet on the upper end of the plumb bob for temporarily retaining the plumb bob in position for locating said center rod below the longitudinal axis of the tractor.

3. A row crop cultivator gauge comprising laterally spaced pairs of longitudinally disposed parallel rods constituting row guides, each pair of said rods being positioned to straddle a row of plants, a single longitudinally disposed center rod positioned between pairs of said row guides and parallel to said row guides, said center rod providing aligning means for positioning the row guides on a tractor in registering relation with rows of plants between which wheels of the tractor are positioned, a guide framework, a transverse shaft for mounting the guide framework on a tractor, L-shaped members carried by the framework and having transversely disposed end sections on extended ends of longitudinally disposed side bars thereof, shovels carried by collars slidably mounted on the side and end portions of the framework, sleeves slidable on said transverse shaft, said longitudinally disposed side bars of the L-shaped members being integral with and extended from said sleeves, shields for preventing plants being covered with soil carried by the longitudinally disposed side bars of the framework, transversely disposed supporting bars positioned forwardly and rearwardly of said tractor, normal to the row guides, and positioned between and connecting ends of said row guides, collars having longitudinal and transverse bores extended therethrough positioned to receive the row guides and supporting bars, respectively, and clamping means on said collars for retaining the parts in operative positions.

References Cited in the file of this patent

UNITED STATES PATENTS

| | | |
|---|---|---|
| 859,832 | Nordstrom | July 9, 1907 |
| 1,949,007 | Butler | Feb. 27, 1934 |
| 2,396,467 | Keasler | Mar. 12, 1946 |
| 2,555,954 | Bruflat | June 5, 1951 |
| 2,590,722 | Otis | Mar. 25, 1952 |
| 2,794,263 | Cranmer | June 4, 1957 |

FOREIGN PATENTS

| | | |
|---|---|---|
| 738,405 | France | Oct. 17, 1932 |